(No Model.)
T. E. ALLEN.
VEHICLE SPRING.
No. 428,440. Patented May 20, 1890.
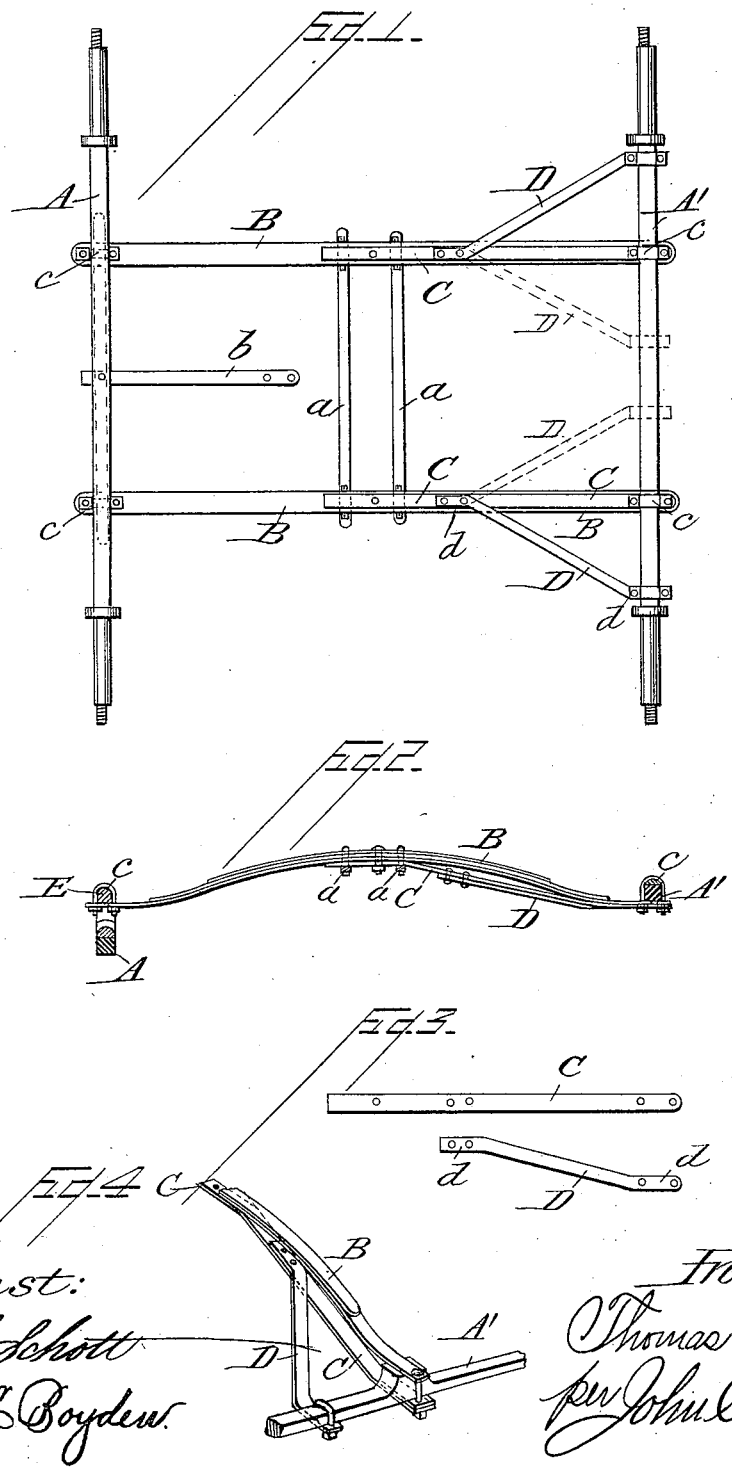
Attest:
H. H. Schott
Wm L. Boyden
Inventor.
Thomas E. Allen
per John C. Tasker
Atty
THE NORRIS PETERS CO., PHOTO-LITHO., WASHINGTON, D. C.

UNITED STATES PATENT OFFICE.

THOMAS E. ALLEN, OF AMSTERDAM, NEW YORK.

VEHICLE-SPRING.

SPECIFICATION forming part of Letters Patent No. 428,440, dated May 20, 1890.

Application filed February 15, 1890. Serial No. 340,528. (No model.)

*To all whom it may concern:*

Be it known that I, THOMAS E. ALLEN, a citizen of the United States, residing at Amsterdam, in the county of Montgomery and State of New York, have invented certain new and useful Improvements in Vehicle-Springs; and I do hereby declare the following to be a full, clear, and exact description of the invention, such as will enable others skilled in the art to which it appertains to make and use the same.

My present invention relates to an improvement in vehicle-springs, the object thereof being to simplify, perfect, strengthen, and make more effective the side springs ordinarily employed with a certain class of carriages or other vehicles; and the invention consists, essentially, in the provision of auxiliary strengthening-bars combined with the said side springs, and, further, in certain details in the construction, arrangement, and combination of parts, substantially as will be hereinafter described and then claimed.

In the accompanying drawings, illustrating my invention, Figure 1 is a bottom plan view of the main parts of the running-gear of the vehicle, the wheels and body being removed. Fig. 2 is a side view of one of the side springs, the parts to which it is connected at each end being shown in section. Fig. 3 is a detail view showing both kinds of braces employed by my invention. Fig. 4 is a perspective view of a modification.

Like letters of reference designate corresponding parts throughout the different figures of the drawings.

A denotes the forward and A' the rear axle of any ordinary vehicle, said axles being constructed in the usual manner.

B B indicate side springs, which are usually employed in certain classes of carriages, said side springs being secured at their ends in the usual manner, the rear ends of the springs being connected to the rear axle A' by means of the clips c, while the other ends of the springs are connected to the bar E, that is arranged pivotally on the forward axle in the usual manner, b being the common brace located in front at the center and attached to the king-bolt underneath the axle.

My invention is applicable to any kind of a vehicle having the parallel springs B B, or any equivalent spring devices located in a similar manner to springs B B, and hence I do not wish to be confined or restricted to any special class or construction of carriages.

$a$ $a$ are transverse connecting-rods, which serve to connect the springs and steady them and to attach the body to.

Underneath the side springs B B, and parallel thereto, is arranged the longitudinal brace C. This brace is shown in detail in Fig. 3. Its location will be clearly understood by referring to Figs. 1 and 2. Its forward end is securely bolted to the spring B underneath the latter and at a point about midway of its length. (See Fig. 2.) The brace C then extends backward until it reaches the axle, being located throughout its entire extent directly below the spring, and it is securely fastened to the axle and rear end of the spring in any desirable way—as, for instance, by having bolts passed through it, as shown in the drawings.

In addition to the main braces C C, I employ auxiliary braces D D. The construction of these braces is indicated in detail in Fig. 3, and their arrangement and combination are clearly shown in Figs. 1 and 2. These braces run diagonally from the main braces to the rear axle. They have a main inclined portion and two short end portions $d$ $d$, which end portions extend in directions parallel to each other and at angles to the inclined portion, and said end portions $d$ $d$ are provided with suitable perforations or apertures, through which pass the bolts or other connecting devices whereby the auxiliary braces are secured in place. The forward end of the auxiliary brace is securely bolted or otherwise fastened to the main brace C. The rear end of the auxiliary brace is firmly connected to the axle. These auxiliary braces may be connected to the axle at points between the springs and the axle-journals, or at points between the two springs. In Fig. 1 I have shown the auxiliary braces in full lines as being fastened to the rear axle near the wheel-journal, and in dotted lines I have indicated them as they might be arranged if they were to project inwardly instead of outwardly and be secured to the axle at points between the points where the rear ends of the two side springs are fastened to the axle. Either plan, or the two in combination, may be adopted in practice with equally good success, it being only necessary that there should be a firm rigid connection between the main brace and the auxiliary brace to prevent any possible lateral movement and to resist any lateral strain.

By the provision of the main brace located beneath the side spring and parallel thereto and the inclined auxiliary brace having one end connected to the main brace and the other to the axle I am enabled to provide a very strong and serviceable construction for a vehicle-spring—a construction which keeps the side springs firmly and immovably in position and conduces greatly to the general value and serviceability of the vehicle.

Modifications and changes may be made in the precise structure and combination of parts without departing from my invention, the essential points of which will be clearly evident from the foregoing.

Instead of the clips c any other well-known means may be employed for connecting the rear ends of the springs to the rear axle, the connection being effected either above or below the axle, but preferably above, since this obviates all rocking of the axle.

In Fig. 4 I have shown a perspective view showing the spring attached to the upper side of the rear axle.

Having thus described my invention, what I claim as new, and desire to secure by Letters Patent, is—

1. In a vehicle, the combination, with the side springs, of the main braces beneath and parallel thereto, said braces being firmly bolted to the side springs at their middle points, and the diagonal auxiliary braces firmly bolted to the main braces and rigidly secured to the axle, substantially as described.

2. In a vehicle-spring, the combination, with the axles A A', the side springs B B, and transverse connections $a\ a$, of the main braces C C, beneath and parallel to the side springs, to which their forward ends are securely bolted near the middle points, and the diagonal auxiliary braces D D, having the ends $d\ d$, said auxiliary braces being secured to the axle and to the main braces, substantially as described.

In testimony whereof I affix my signature in presence of two witnesses.

THOS. E. ALLEN.

Witnesses:
J. E. WILLIAMS,
P. H. SMEALLIE.